United States Patent Office 3,540,167
Patented Nov. 17, 1970

3,540,167
GRINDING OF CUTTING TIPS
Einar J. H. Granath, Huddinge, Sweden, assignor to AB Broderna Granaths Mekaniska Verkstader, Huddinge, Sweden, a corporation of Sweden
Filed Dec. 8, 1966, Ser. No. 600,183
Int. Cl. B24b 1/00
U.S. Cl. 51—281      2 Claims

ABSTRACT OF THE DISCLOSURE

A method of providing in cutting tips and like tools a recess facilitating the cutting operation by guidance of the chips, is characterized by the steps of arranging a very thin rotary grinding wheel in such a way relative to the cutting tip that the wheel can be rotated about a diametral axis which extends perpendicularly to the chip breaking side of the cutting tip, and causing that portion of the grinding wheel, which works the chip breaking side of the cutting tip adjacent the edge thereof upon displacement of the grinding wheel in parallel with the edge of the cutting tip as a function of the angular position adjusted, to provide a channel-shaped recess in the chip breaking side of the cutting tip along the edge thereof, the cross section of the recess being dependent upon the angular position of the grinding wheel into which it is adjusted prior to displacement. The cross section of the recess can vary between a minimum value corresponding to the rounded edge profile of the grinding wheel and a maximum value corresponding to the total peripheral curvature of the grinding wheel.

---

This invention relates to a method of grinding cutting tips, preferably carbide tips, with the use of a rotary grinding wheel to provide adjacent the edge of the tip a recess facilitating the cutting operation.

The invention is characterized by the steps of mounting a grinding wheel of slight thickness rotatably in relation to the cutting tip about a diametral axis of said grinding wheel, said axis extending substantially perpendicularly to the surface of the chip-breaking side of the cutting tip at the cutting edge thereof, arranging the cutting tip and the grinding wheel relatively displaceable, the displacement to take place in a tangential plane of the grinding wheel and parallel to the cutting edge, adjusting the grinding wheel in relation to the cutting tip by rotation about said axis so that the angle between the plane of rotation of the grinding wheel and the cutting edge of the cutting tip will have a value between 0° and 90°, and providing the desired recess adjacent said cutting edge on the chip-breaking side of the cutting tip while displacing the thus adjusted rotary grinding wheel in the direction of the cutting edge.

Figure 1A:
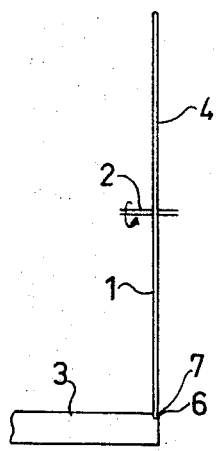
Figure 1B:
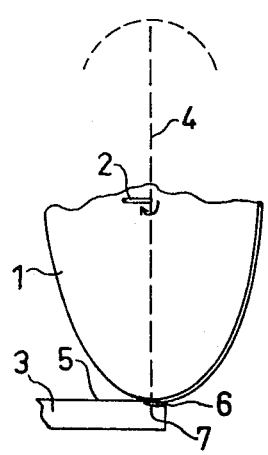
Figure 1C:
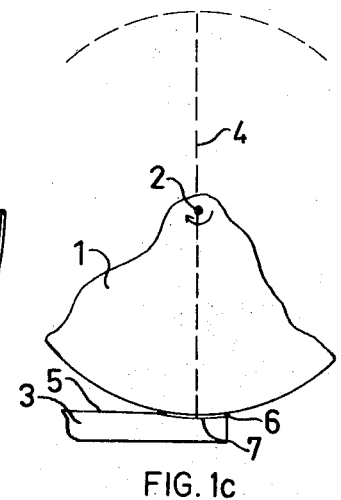

The above features of the invention and the advantages to be gained thereby will appear from the following description in which reference is made to the accompanying drawing which in FIGS. 1a, 1b and 1c diagrammatically illustrates the principle of the grinding method according to the invention.

In the drawing, a thin grinding wheel 1 having a rounded edge profile is so mounted as to rotate about its axis 2 and is so disposed in relation to the cutting tip 3 as to be rotatable about a diameter 4. The grinding wheel 1 is adapted to engage the chip-breaking side 5 of the cutting tip 3 at the edge 6 effecting the cutting operation. When made operative, the grinding wheel 1 will provide a recess 7 in the cutting tip adjacent the cutting edge 6 thereof.

It is shown in FIGS. 1a–1c how the recess 7 in the chip-breaking side of the cutting tip can be given a plurality of different radii or sections by utilizing the rotatability of the grinding wheel about the diameter 4. The narrowest recess is obtained when, as in FIG. 1a, the grinding wheel 1 is parallel or substantially parallel to the cutting edge 6 of the cutting tip, the width of the recess 7 substantially conforming to the rounded edge of the grinding wheel. On the other hand, the widest recess is obtained when, as in FIG. 1c, the grinding wheel 1 is perpendicular to the cutting tip edge 6, in which case the recess 7 in cross section will be of circular arc profile and have a radius substantially conforming to that of the grinding wheel 1. By setting the grinding wheel in positions intermediate to the positions just mentioned, for example the position shown in FIG. 1b, the section of the recess 7 can be varied between the values earlier mentioned.

The recess 7 realized by means of a grinding wheel, the plane of rotation of which is perpendicular or substantially perpendicular to the chip-breaking side of the cutting tip and the position of which is adjustable in the manner outlined in the foregoing, contributes to considerably improving the properties of the cutting tip thanks to the symmetrical shape of the recess.

It will readily be seen by those skilled in the art that the invention is not limited to the embodiment described above and shown in the drawing but permits of being modified in several ways within the scope of the appended claims.

What I claim and desire to secure by Letters Patent is:
1. A method of grinding cutting tips having a cutting edge and a top surface extending rearwardly from the cutting edge for engaging material cut by the cutting edge, with the use of a rotary grinding wheel to provide in said top surface adjacent the cutting edge a recess defined by an arcuate surface facilitating cutting when the tip is in use; the method comprising the steps of, mounting a grinding wheel of slight thickness rotatably in relation to the cutting tip about a diametrical axis of said grinding wheel, said axis extending substantially perpendicularly to said top surface adjacent the cutting edge, arranging the cutting tip and the grinding wheel relatively displaceable in a tangential plane of the grinding wheel and parallel to said cutting edge, adjusting the grinding wheel in relation to the cutting tip by rotation about said axis so that the angle between the plane of rotation of the grinding wheel and said cutting edge will be between zero and ninety degrees engaging the grinding wheel against said top surface and grinding the desired recess in said top surface adjacent said cutting edge while displacing the thus adjusted grinding wheel in the direction of said cutting edge.

2. A method of grinding cutting tips having a cutting edge and a top surface extending rearwardly from the cutting edge for facilitating a cutting operation by engaging and guiding material cut by said cutting edge when the cutting tip is in use; the method comprising the steps of so mounting a grinding wheel of slight thickness and with a rounded edge profile in relation to a cutting tip to permit a mutual relative displacement in the cutting edge direction between the grinding wheel and the cutting tip, said top surface of the cutting tip being adapted to be held parallel to a tangential plane of the grinding wheel so as to be rotatable about an axis (4) which extends substantially along a diametrical line of the grinding wheel perpendicular to said top surface and said tangential plane, and so as to be displaceable both along said diametrical line relative to the plane of said top surface and at right angles to the longitudinal direction of said cutting edge, adjusting the grinding wheel (1) by rotating it about said diametrical axis (4) to such a position that the angle between the plane of rotation of the grinding wheel and the said cutting edge will be between zero and ninety degrees, adapting the position of the grinding wheel in such a way that the tangent point directed towards the plane of said top surface will be spaced a suitable right angular distance inside the cutting edge and take a position, corresponding to the desired depth of the recess (7) beneath the plane of said top surface along said diametrical axis, and engaging the grinding wheel against said top surface and grinding the desired recess in the top surface adjacent the cutting edge by displacement of the cutting tip relative to the grinding wheel in the direction of said cutting edge and in parallel with the plane of said top surface.

References Cited

UNITED STATES PATENTS

| | | |
|---|---|---|
| 1,046,801 | 12/1912 | Kelder. |
| 1,087,527 | 2/1914 | Button. |
| 1,434,131 | 10/1922 | Lutz _____ 51—92 |
| 2,189,015 | 2/1940 | Maurer _____ 51—92 |
| 2,490,614 | 12/1949 | Bedford _____ 51—92 |
| 2,885,831 | 5/1959 | Farnsworth _____ 51—92 |

LESTER M. SWINGLE, Primary Examiner